(12) United States Patent
Kuang et al.

(10) Patent No.: US 9,661,700 B2
(45) Date of Patent: May 23, 2017

(54) PRIMARY CONTROL LED DRIVER WITH ADDITIONAL POWER OUTPUT AND CONTROL METHOD THEREOF

(71) Applicant: Hangzhou MPS Semiconductor Technology Ltd., Hangzhou (CN)

(72) Inventors: Naixing Kuang, Hangzhou (CN); Qiming Zhao, Hangzhou (CN)

(73) Assignee: Hangzhou MPS Semiconductor Technology Ltd., Hangzhou (CN)

( * ) Notice: Subject to any disclaimer, the term of this patent is extended or adjusted under 35 U.S.C. 154(b) by 8 days.

(21) Appl. No.: 14/937,846

(22) Filed: Nov. 10, 2015

(65) Prior Publication Data
US 2016/0150608 A1 May 26, 2016

(30) Foreign Application Priority Data
Nov. 21, 2014 (CN) .......................... 2014 1 0674405

(51) Int. Cl.
*H05B 33/08* (2006.01)
*H05B 37/02* (2006.01)
*H02M 3/335* (2006.01)
*H02M 1/00* (2006.01)
*H02M 3/156* (2006.01)

(52) U.S. Cl.
CPC ..... *H05B 33/0815* (2013.01); *H05B 33/0851* (2013.01); *H05B 37/0272* (2013.01); *H02M 3/156* (2013.01); *H02M 3/33507* (2013.01); *H02M 2001/0003* (2013.01)

(58) Field of Classification Search
CPC ........... H05B 33/0815; H05B 33/0851; H02M 3/156; H02M 3/33507; H02M 2001/0003

USPC ... 315/307, 209 R, 212, 216, 219, 221, 291; 363/21.12, 21.01, 21.16, 21.17, 21.18
See application file for complete search history.

(56) References Cited

U.S. PATENT DOCUMENTS

| | | | | |
|---|---|---|---|---|
| 6,956,750 B1* | 10/2005 | Eason | ............... | H02M 3/33523 363/21.01 |
| 7,457,138 B2* | 11/2008 | Sheng | ............... | H02M 3/33523 363/21.12 |
| 7,564,225 B2 | 7/2009 | Moraveji et al. | | |
| 7,872,455 B2 | 1/2011 | Moraveji et al. | | |
| 8,928,305 B2 | 1/2015 | Ueunten et al. | | |
| 2010/0066337 A1* | 3/2010 | Gong | .................. | H02M 1/4225 323/285 |

(Continued)

*Primary Examiner* — Thai Pham
*Assistant Examiner* — Borna Alaeddini
(74) *Attorney, Agent, or Firm* — Perkins Coie LLP (57) ABSTRACT

A primary control LED driver includes: a switching converter having a main switch and a first winding, and configured to provide an LED driving current; a second winding magnetically coupled to the first winding and configured to provide a power supply voltage at a first terminal; a first sensing resistor with a first terminal coupled to the main switch; a second sensing resistor with a first terminal coupled to the second terminals of the first sensing resistor and the second winding; an output current calculator calculating an equivalent value of the LED driving current based on the voltage at the first terminal of the first sensing resistor; an error amplifier configured to generate a compensation signal based on the equivalent value and a reference voltage; and a control circuit generating a control signal to control the main switch based on the compensation signal.

17 Claims, 9 Drawing Sheets

(56) References Cited

U.S. PATENT DOCUMENTS

| | | | | |
|---|---|---|---|---|
| 2014/0177289 A1* | 6/2014 | Chen | ............ | H02M 3/33515 363/21.13 |
| 2014/0210377 A1* | 7/2014 | Knoedgen | ......... | H02M 3/33507 315/307 |
| 2015/0022168 A1* | 1/2015 | Mednik | ............ | H02M 3/155 323/282 |

* cited by examiner

FIG. 1

(PRIOR ART)

PRIMARY CONTROL LED DRIVER WITH ADDITIONAL POWER OUTPUT AND CONTROL METHOD THEREOF

CROSS-REFERENCE TO RELATED APPLICATIONS

This application claims the benefit of CN application 201410674405.3, filed on Nov. 21, 2014 and incorporated herein by reference.

TECHNICAL FIELD

The present invention generally relates to electronic circuits, and more particularly but not exclusively to LED drivers

BACKGROUND

Nowadays, there is an increasing interest to replace conventional fluorescent lamps with LEDs (light emitting diodes) in LCD backlighting and other lighting applications. Generally, LEDs need a driver to provide a controllable current. Moreover, in some applications, power supply voltages, such as 12V, 5V etc. are further needed for other circuits or chips.

Figure 1:
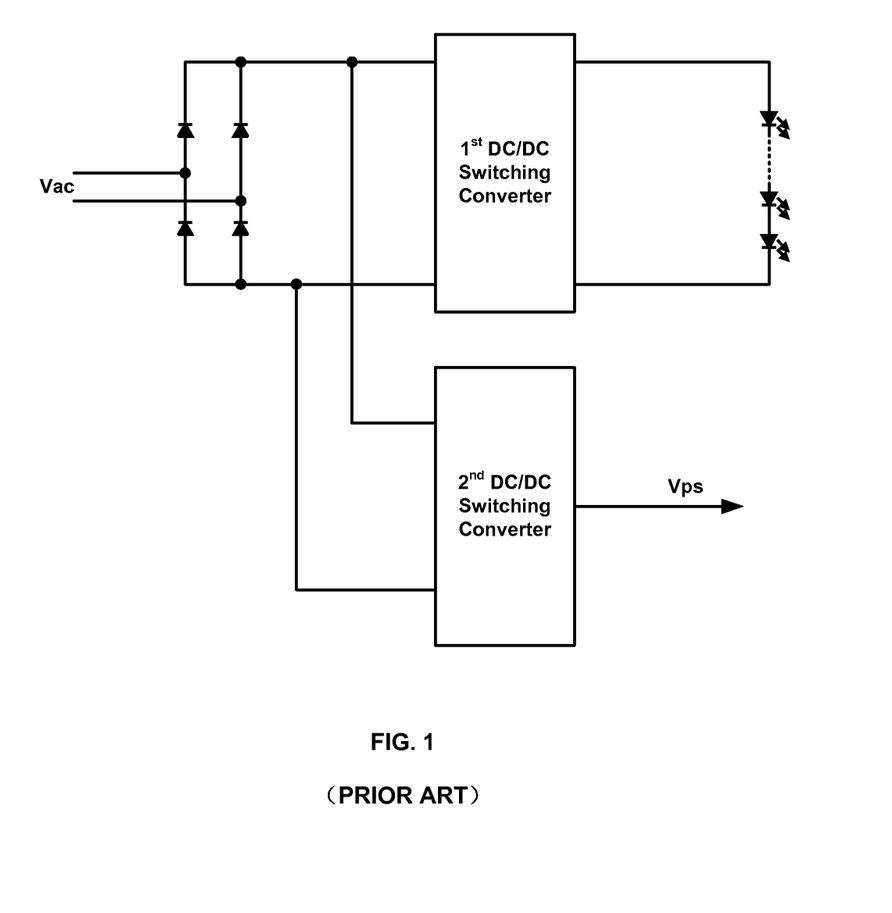
FIG. 1 schematically illustrates a prior art LED driver.

FIG. 1 illustrates a prior art LED driver wherein two individual DC/DC switching converters are involved. The first DC/DC switching converter is configured to generate a driving current for LEDs, while the second DC/DC switching converter is configured to provide a power supply voltage Vps for other circuits or chips.

Since the LED driver shown in FIG. 1 needs two high voltage DC/DC switching converters, its size is large and it also suffers from high cost.

SUMMARY

Embodiments of the present invention are directed to an LED driver, comprising: a switching converter configured to provide a driving current for an LED, wherein the switching converter has a main switch and a first winding coupled to the main switch, and wherein the first winding stores energy when the main switch is on and provides the energy to the LED when the main switch is off; a second winding magnetically coupled to the first winding, wherein the second winding has a first terminal configured to provide a power supply voltage and a second terminal; a first sensing resistor having a first terminal and a second terminal, wherein the first terminal is coupled to the main switch; a second sensing resistor having a first terminal and a second terminal, wherein the first terminal is coupled to the second terminal of the first sensing resistor and the second terminal of the second winding, the second terminal is coupled to a reference ground; an output current calculator coupled to the first terminal of the first sensing resistor, wherein based on the voltage at the first terminal of the first sensing resistor, the output current calculator calculates an equivalent value of the driving current and generates an equivalent current signal; an error amplifier coupled to the output current calculator and configured to generate a compensation signal based on the equivalent current signal and a reference voltage; and a control circuit coupled to the error amplifier, wherein based on the compensation signal, the control circuit generates a control signal to control the main switch.

Embodiments of the present invention are also directed to an LED driver, comprising: a switching converter configured to provide a driving current for an LED, wherein the switching converter has a main switch and a first winding coupled to the main switch, and wherein the first winding stores energy when the main switch is on and provides the energy to the LED when the main switch is off; a second winding magnetically coupled to the first winding and configured to provide a power supply voltage; a signal processor configured to receive a first current sensing signal indicative of the current flowing through the main switch and a second current sensing signal indicative of the current flowing through the second winding, wherein based on the first and second current sensing signals, the signal processor generates a processing signal; an output current calculator coupled to the signal processor, wherein based on the processing signal, the output current calculator calculates an equivalent value of the driving current and generates an equivalent current signal; an error amplifier coupled to the output current calculator and configured to generate a compensation signal based on the equivalent current signal and a reference voltage; and a control circuit coupled to the error amplifier, wherein based on the compensation signal, the control circuit generates a control signal to control the main switch.

Embodiments of the present invention are further directed to a control method of an LED driver, wherein the LED driver configured to provide a driving current for an LED comprises a main switch, a first winding coupled to the main switch and a second winding magnetically coupled to the first winding. The first winding stores energy when the main switch is on and provides the energy to the LED when the main switch is off. The control method comprises: sensing the current flowing through the main switch and generating a first current sensing signal; sensing the current flowing through the second winding and generating a second current sensing signal; generating a processing signal based on the first and second current sensing signals; calculating an equivalent value of the driving current and generating an equivalent current signal based on the processing signal; generating a compensation signal based on the equivalent current signal and a reference voltage; and generating a control signal based on the compensation signal to control the main switch.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

To solve the problem mentioned in the background, the present invention proposes an LED driver with quite simple structure. In this LED driver, a switching converter including a main switch and a first winding is utilized to generate an LED driving current, wherein the main switch stores energy when the main switch is on and provides the energy to the LED when the main switch is off. A second winding is magnetically coupled to the first winding and configured to provide a power supply voltage for other circuits or chips through a voltage regulator (such as LDO, low drop out linear regulator).

Figure 2:
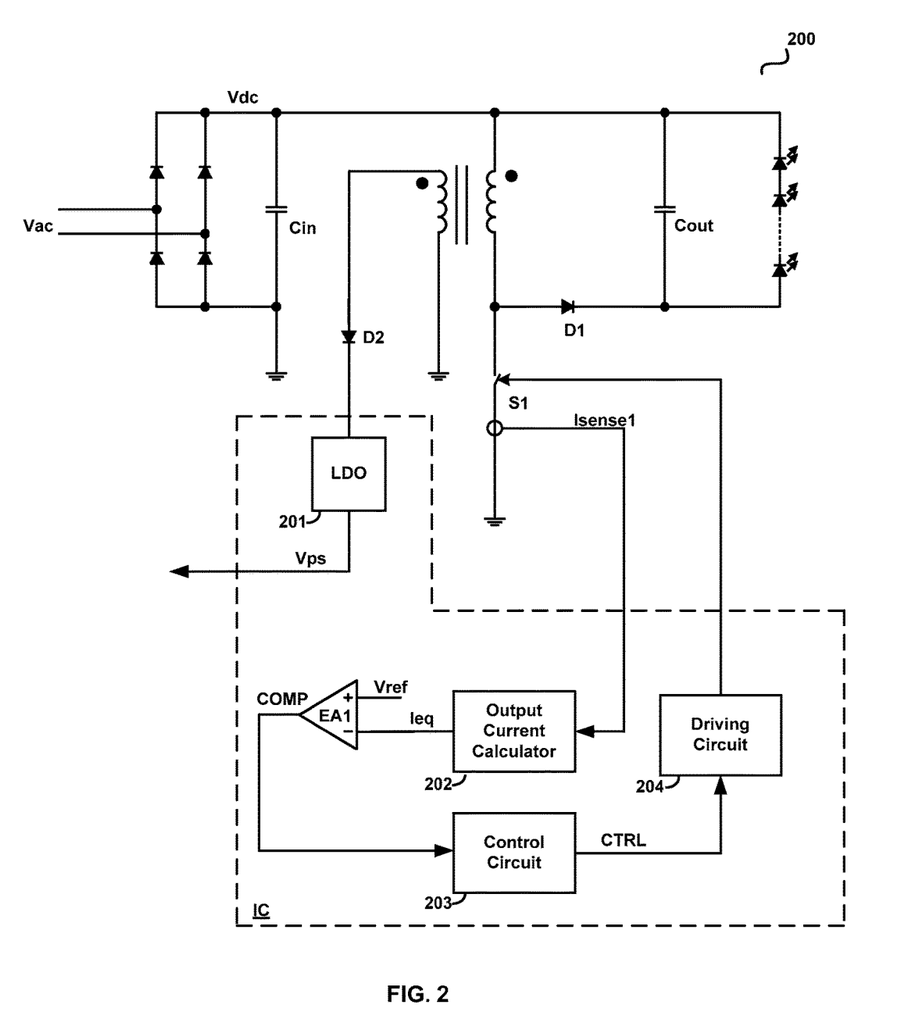
FIG. 2 schematically illustrates a block diagram of an LED driver 200 in accordance with an embodiment of the present invention.

FIG. 2 schematically illustrates a block diagram of an LED driver 200 in accordance with an embodiment of the present invention, wherein a rectifier bridge receives an AC input voltage Vac and converts it into a DC voltage Vdc. The switching converter configured to provide an LED driving current is a Buck-Boost circuit coupled to the output terminal of the rectifier bridge. It comprises an input capacitor Cin, a first winding, a main switch S1, a diode D1 and an output capacitor Cout. A second winding is magnetically coupled to the first winding with one terminal coupled to an LDO 201 and another terminal coupled to a reference ground. The LDO 201 is configured to provide a power supply voltage Vps.

To avoid the use of an LED current feedback circuit, primary control method is often utilized. The current flowing though the main switch S1 is involved to calculate an equivalent value of the LED driving current, which is then utilized for current regulation. As shown in FIG. 2, based on the current sensing signal Isense1 indicative of the current flowing though the main switch S1, an output current calculator 202 calculates an equivalent value of the LED driving current and generates an equivalent current signal Ieq. In one embodiment, the equivalent current signal Ieq is zero when the main switch S1 is on and the diode D1 is off, while it is equal to the peak value of the current sensing signal Isense1 when the main switch is off and the diode D1 is on. An error amplifier EA1 receives the equivalent current signal Ieq and generates a compensation signal COMP based thereon. According to the compensation signal COMP, a control circuit 203 produces a control signal CTRL to control the main switch S1 through a driving circuit 204. The LDO 201, output current calculator 202, error amplifier EA1, control circuit 203 and driving circuit 204 may be integrated together, e.g., in a control IC.

The transformer formed by the first and second windings can be deemed as an ideal transformer with a parallel magnetization inductor. When the main switch S1 is off, the diode D1 is on and the diode D2 is off. The current flowing through the second winding is zero, and the LED driving current is determined by the current flowing though the magnetization inductor. When the main switch S1 is on, the diode D1 is off and the diode D2 is on. The current flowing through the main switch S1 not only includes the current flowing through the magnetization inductor, but also influenced by the current flowing through the second winding. Therefore, the equivalent current signal Ieq generated based on the current sensing signal Isense1 is also affected by the current flowing through the second winding and cannot accurately reflect the LED driving current. If the transient power of the circuits or chips supported by the power supply voltage is not negligible, the current flowing through the second winding will be large (e.g. tens of milliampere) and the impact of the power supply voltage loop on the LED current loop will be obvious.

Figure 3:
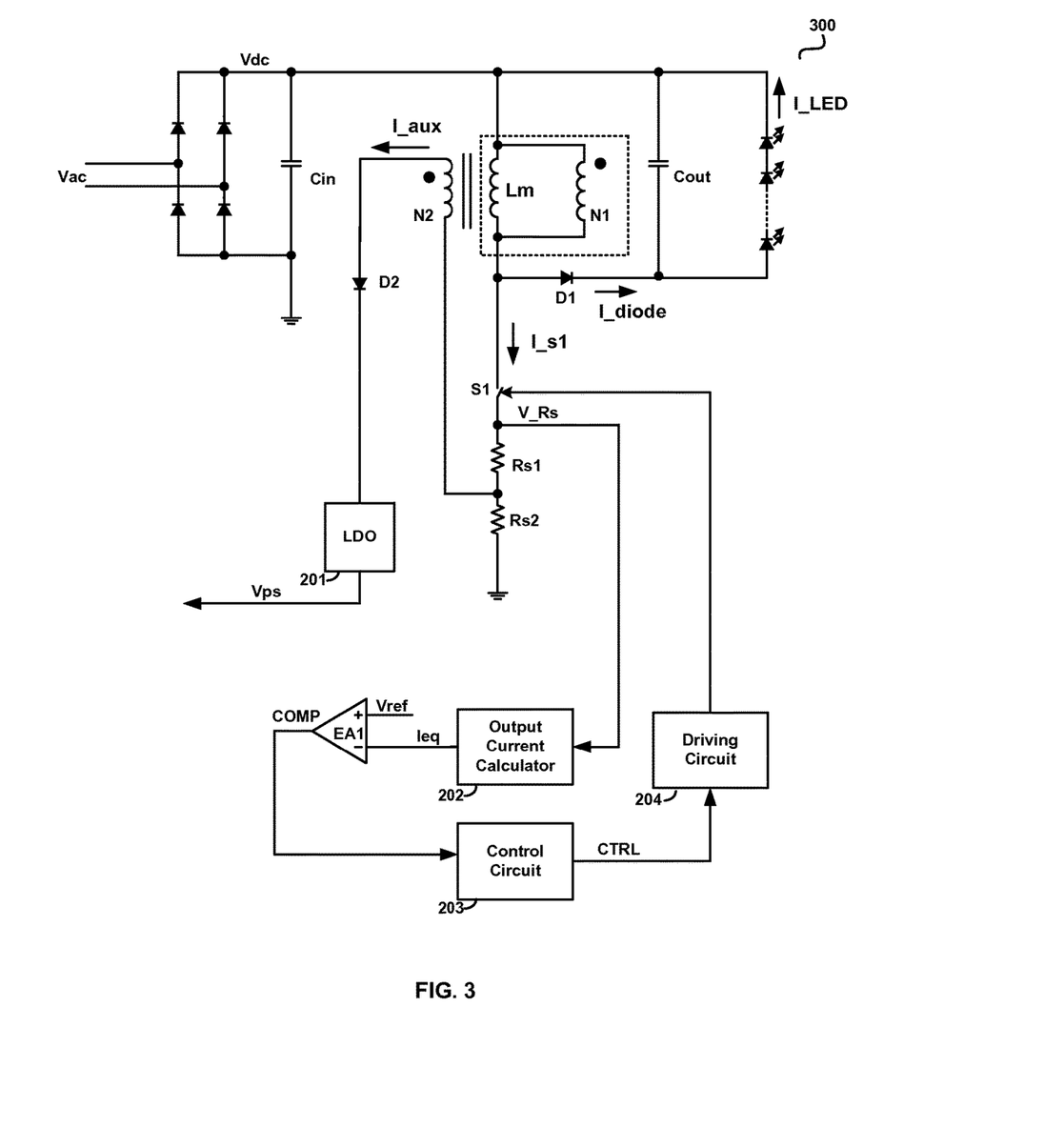
FIG. 3 schematically illustrates a block diagram of an LED driver 300 in accordance with an embodiment of the present invention.

FIG. 3 schematically illustrates a block diagram of an LED driver 300 in accordance with an embodiment of the present invention. Compared with the circuit show in FIG. 2, the LED driver 300 further comprises sensing resistors Rs1 and Rs2. The sensing resistor Rs1 has a first terminal and a second terminal, wherein the first terminal is coupled to the main switch S1. The sensing resistor Rs2 has a first terminal and a second terminal, wherein the first terminal is coupled to the second terminal of the sensing resistor Rs1, the second terminal is coupled to the reference ground. The second winding has a first terminal and a second terminal, wherein the first terminal is coupled to the LDO 201 through the diode D2, the second terminal is coupled to the second terminal of the sensing resistor Rs1 and the first terminal of the sensing resistor Rs2. The output current calculator 202 is coupled to the first terminal of the sensing resistor Rs1 and configured to generate the equivalent current signal Ieq based on the voltage V_Rs at the first terminal of the sensing resistor Rs1.

As shown in FIG. 3, the transformer formed by the first and second windings is illustrated as an ideal transformer with a parallel magnetization inductor Lm. When the main switch S1 is off, the current I_s1 flowing through the main switch S1 is zero. When the main switch S1 is on, the current I_s1 can be described as:

$$I\_s1 = I\_Lm + \frac{N2}{N1} \times Iaux \quad (1.1)$$

Wherein I_Lm indicates the current flowing through the magnetization inductor Lm, Iaux indicates the current flowing through the second winding, and $$\frac{N2}{N1}$$

is the turn ratio between the second winding and the first winding.

Here, the voltage V_Rs can be expressed as:

$$V\_Rs = I\_s1 \times (Rs1 + Rs2) - Iaux \times Rs2 \quad (1.2)$$

Combining equation (1.1) with equation (1.2), we can get:

$$V\_Rs = I\_Lm \times (Rs1 \times Rs2) + Iaux \times \left[\frac{N2}{N1} \times Rs1 - \left(1 - \frac{N2}{N1}\right) \times Rs2\right] \quad (1.3)$$

If $$\frac{N2}{N1} \times Rs1 = \left(1 - \frac{N2}{N1}\right) \times Rs2 \quad (1.4)$$

We can get:

$$V\_Rs = I\_Lm \times (Rs1 + Rs2) \quad (1.5)$$

This means, the voltage V_Rs is only related to the current I_Lm flowing through the magnetization inductor Lm and not affected by the current I_aux flowing through the second winding. Consequently, the LED current loop and the power supply voltage loop are decoupled. The equivalent current signal Ieq generated based on the voltage V_Rs can imitate the LED driving current I_LED accurately, which ensures a precise current regulation.

Figure 4:
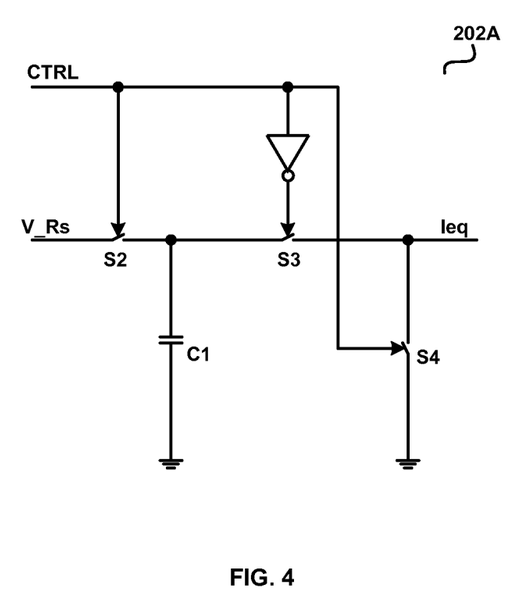
FIG. 4 schematically illustrates an output calculator 202A in accordance with an embodiment of the present invention.

FIG. 4 schematically illustrates an output calculator 202A in accordance with an embodiment of the present invention. The output current calculator 202A comprises a capacitor C1 and switches S2~S4 controlled by the control signal CTRL. When the main switch S1 is on, the switches S2 and S4 are on and the switch S3 is off, the equivalent current signal Ieq is zero. When the main switch S1 is off, the switches S2 and S4 are off, the switch S3 is on. The equivalent current signal Ieq is then equal to the voltage across the capacitor C1 which is the peak value of the signal V_Rs.

Figure 5:
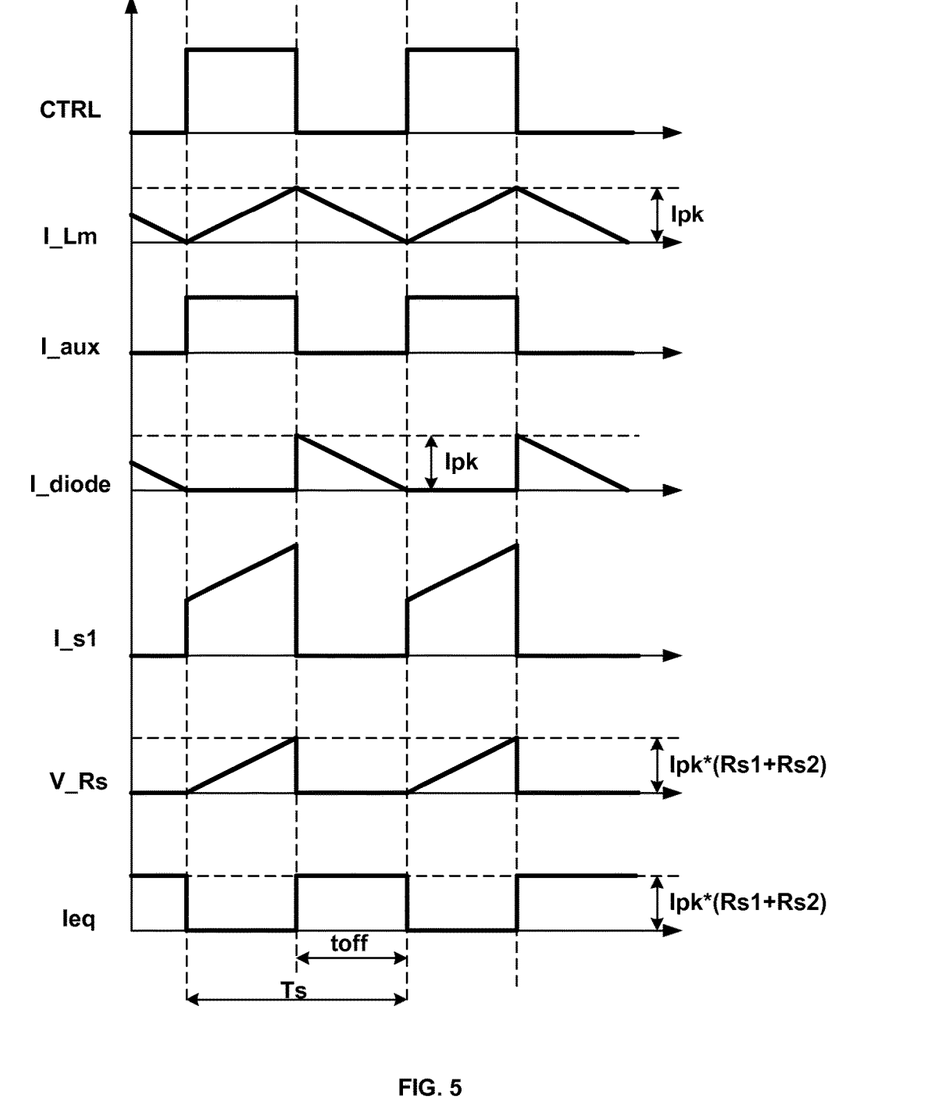
FIG. 5 schematically illustrates working waveforms of the LED driver 300 in accordance with an embodiment of the present invention.

FIG. 5 schematically illustrates working waveforms of the LED driver 300 in discontinuous current mode in accordance with an embodiment of the present invention, wherein I_diode indicates the current flowing through the diode D1. As can be seen from FIG. 5, when the control signal CTRL is logical high, the main switch S1 and the diode D2 are on, the diode D1 is off. The current I_Lm flowing through the magnetization inductor Lm gradually increases, and the current I_aux flowing through the second winding is larger than zero. When the control signal CTRL is logical low, the main switch S1 and the diode D2 are both off, the diode D1 is on. The current Iaux flowing through the second winding is zero, the current I_diode flowing through the diode D1 is equal to the current I_Lm and decreases steadily.

Due to the output capacitor Cout, the LED driving current I_LED is equal to the average value of the current I_diode and can be expressed as:

$$I\_LED = I\_diode_{ave} = \frac{Ipk \times toff}{2 \times Ts} \quad (1.6)$$

Wherein Ipk is the peak value of the current I_diode in a switching cycle, Ts is the switching cycle, and toff is the off time of the main switch S1.

Since the equivalent current signal Ieq is zero when the main switch S1 is on and the diode D1 is off, and is equal to the peak value of the signal V_Rs when the main switch S1 is off and the diode D1 is on, the average value of the equivalent current signal Ieq can be expressed as:

$$Ieq_{ave} = \frac{Ipk \times (Rs1 + Rs2) \times toff}{Ts} \quad (1.7)$$

Thanks to the error amplifier EA1, the average value of the equivalent current signal Ieq will be regulated to be equal to the reference voltage Vref. So based on equations (1.6) and (1.7), we can get:

$$I\_LED = \frac{Vref}{2 \times (Rs1 + Rs2)} \quad (1.8)$$

It is apparent from equation (1.8) that the accurate regulation of the LED driving current I_LED can be simply realized after the decoupling between the LED current loop and the power supply voltage loop.

Figure 6:
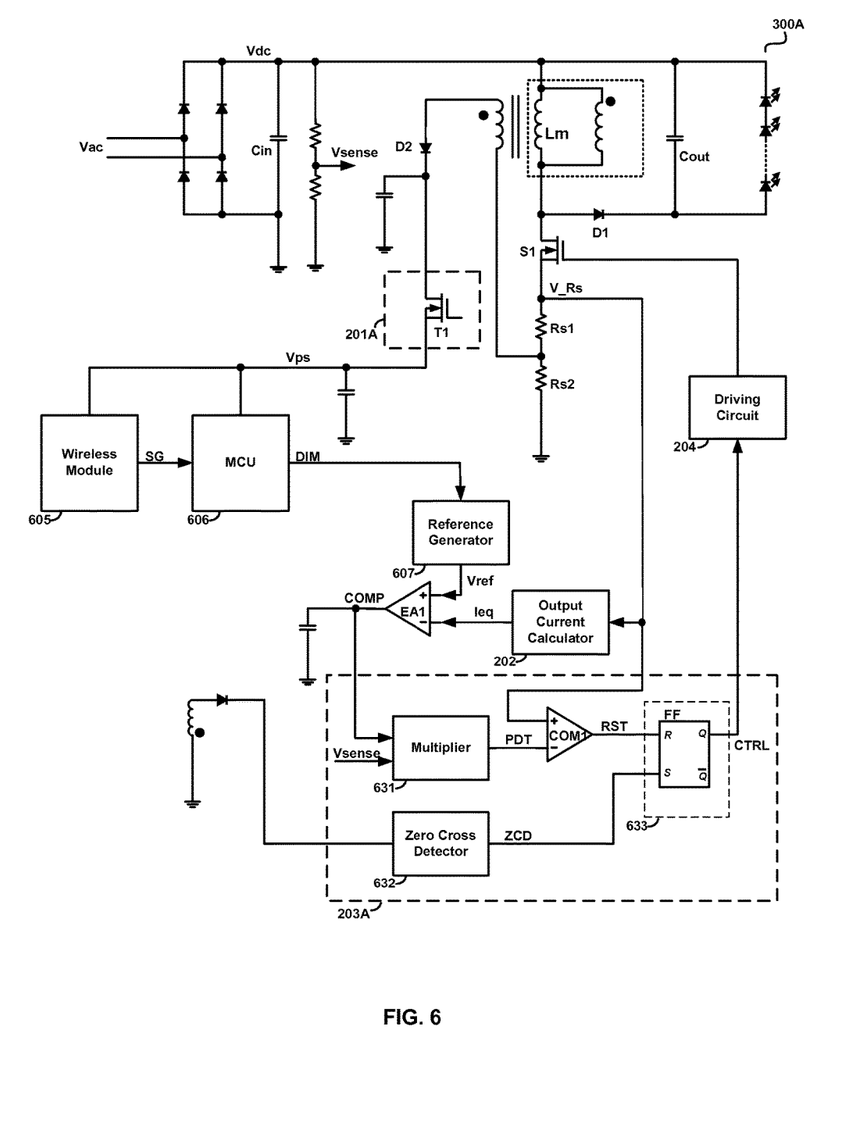
FIG. 6 schematically illustrates an LED driver 300A in accordance with an embodiment of the present invention.

FIG. 6 schematically illustrates an LED driver 300A in accordance with an embodiment of the present invention. As shown in the figure, the LDO 201A includes a transistor T1. The control circuit 203A comprises a multiplier 631, a zero cross detector 632, a logic circuit 633 and a comparator COM1. The multiplier 631 has a first input terminal, a second input terminal and an output terminal, wherein the first input terminal is configured to receive an input sensing signal Vsense indicative of the DC voltage Vdc, the second input terminal is coupled to the error amplifier EA1 to receive the compensation signal COMP. The multiplier 631 multiplies the input sensing signal Vsense with the compensation signal COMP and generates a product signal PDT at the output terminal. The comparator COM1 has a first input terminal, a second input terminal and an output terminal, wherein the first input terminal is coupled to the first terminal of the sensing resistor Rs1 to receive the voltage V_Rs, the second input terminal is coupled to the output terminal of the multiplier 631 to receive the product signal PDT, and the output terminal is configured to provide a comparison signal RST. The zero cross detector 632 is configured to detect whether the current flowing through the first winding crosses zero and generate a zero cross detection signal ZCD. The logic circuit 633 has a first input terminal, a second input terminal and an output terminal, wherein the first input terminal is coupled to the output terminal of the comparator COM1, the second input terminal is coupled to the zero cross detector 632, and wherein based on the comparison signal RST and the zero cross detection signal ZCD, the logic circuit 633 generates the control signal CTRL at the output terminal. The logic circuit 633 may include a flip flop FF as shown in FIG. 6. It turns off the main switch S1 when the voltage V_Rs becomes larger than the product signal PDT, and turns on the main switch S1 when the current flowing through the first winding crosses zero.

In one embodiment, besides the second winding, the LED driver 300A further comprises a third winding magnetically coupled to the first winding. The zero cross detector 632 monitors the voltage across the third winding to detect whether the current flowing through the first winding crosses zero.

In one embodiment, the power supply voltage Vps is provided to a wireless module 605 and a microcontroller unit (MCU) 606. The wireless module 605 receives a wireless signal SG and provides it to the MCU 606. Based on the wireless signal SG, the MCU 606 generates a dimming signal DIM to adjust the brightness of the LED. This dimming signal DIM may be provided to a reference generator 607. In accordance with the dimming signal DIM, the reference generator 607 generates the reference voltage Vref and provides it to the error amplifier EA1. In one embodiment, if the dimming signal DIM maintains logical low in a predetermined time period (e.g. 10 mS), the reference generator 607 will adjust the reference voltage Vref to an ultra low value to make the LED driving current zero.

Figure 7:
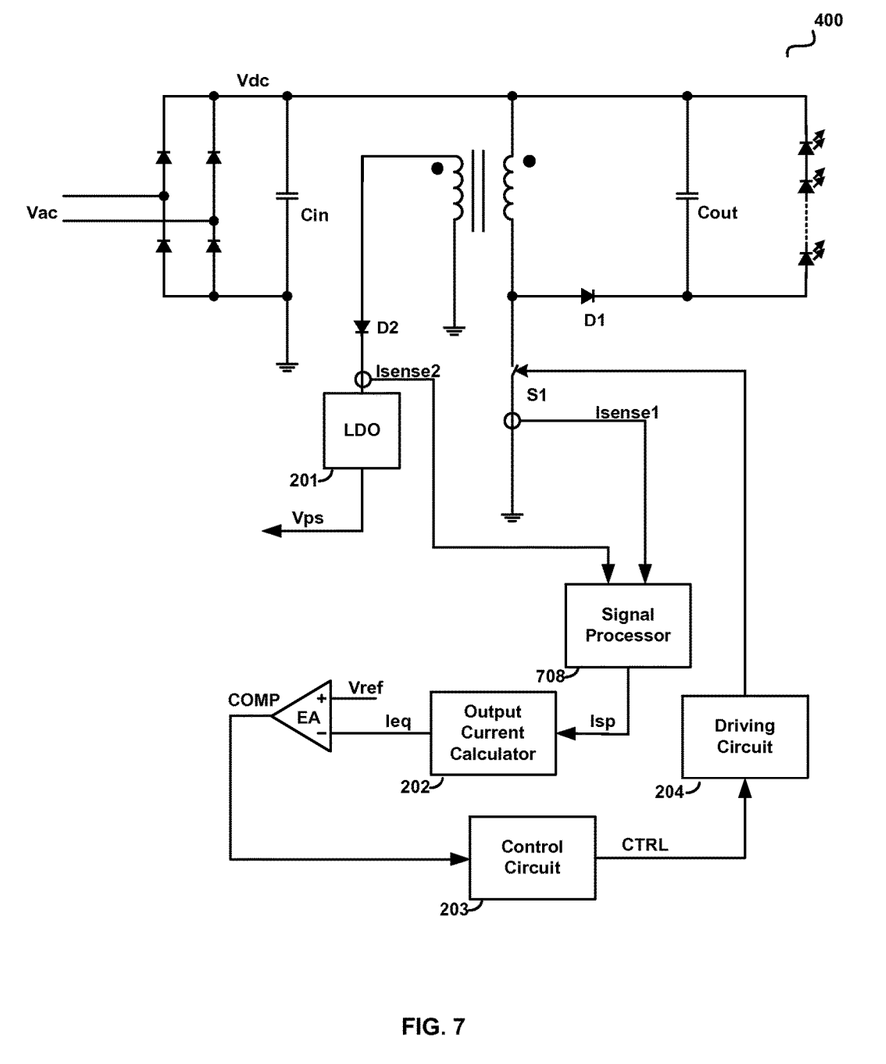
FIG. 7 schematically illustrates an LED driver 400 in accordance with an embodiment of the present invention.

The embodiments shown in FIGS. 3 and 5 both utilize the specific connection between the sensing resistors Rs1, Rs2 and the second winding to decouple the power supply voltage loop from the LED current loop. However, it should be noted that this is not to limit the scope of the present invention, and the decoupling mentioned above may also be utilized through other embodiments such as shown in FIG. 7. In the LED driver 400 of FIG. 7, a signal processor 708 receives a current sensing signal Isense1 indicative of the current flowing through the main switch S1 and a current sensing signal Isense2 indicative of the current flowing through the second winding. According to these two current sensing signals, the signal processor 708 generates a processing signal Isp based on which the output current calculator 202 generates the equivalent current signal Ieq.

Owing to the signal processor 708, the processing signal Isp will not be affected by the current flowing through the second winding. In one embodiment, the processing signal Isp is the difference between the current sensing signals Isense1 and Isense2, and can be expressed as:

$$Isp = Isense1 - Isense2 = K1 \times \left(I\_Lm + \frac{N2}{N1} \times Iaux\right) - K2 \times Iaux \quad (1.9)$$

Wherein K1 and K2 are both current sensing coefficients. If $$K1 \times \frac{N2}{N1} \times Iaux = K2 \times Iaux \quad (1.10)$$

Then we can get:

$$Isp = K1 \times I\_Lm \quad (1.11)$$

Figure 8:
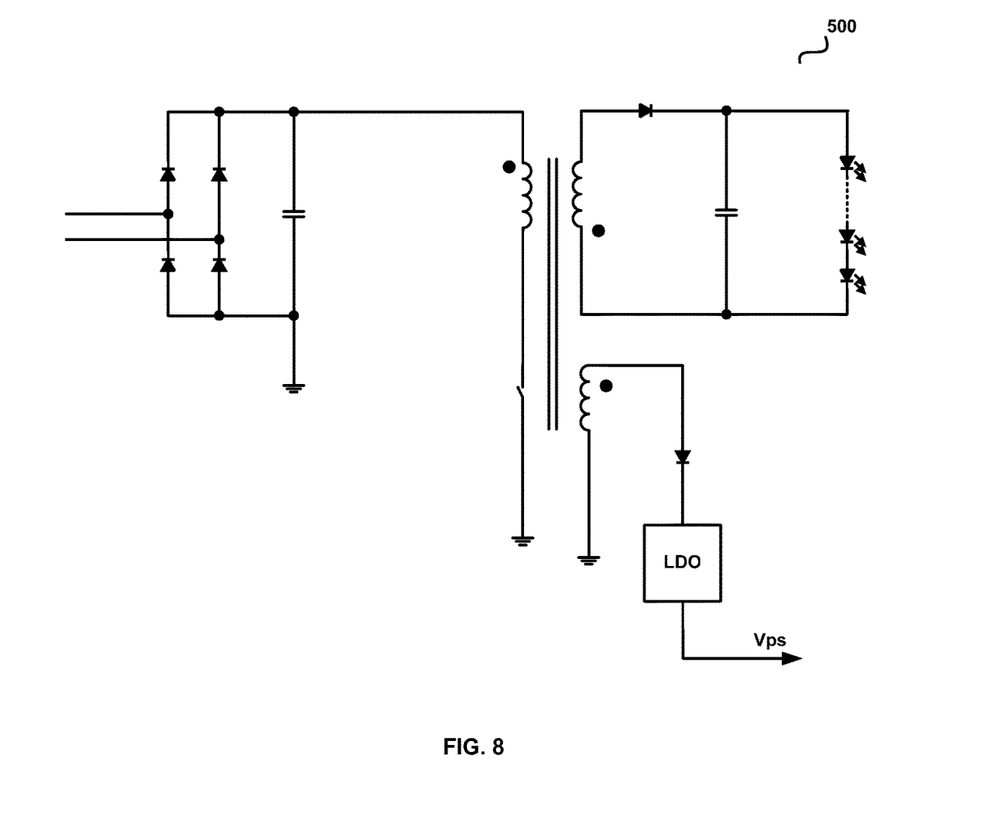
FIG. 8 schematically illustrates an LED driver 500 in accordance with an embodiment of the present invention.
Figure 9:
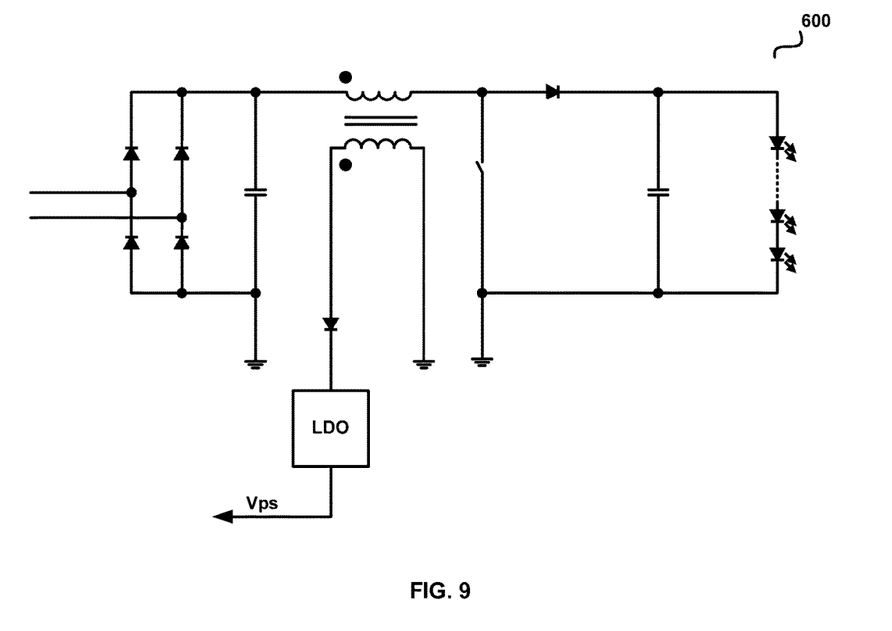
FIG. 9 schematically illustrates an LED driver 600 in accordance with an embodiment of the present invention.

In the embodiments described above, the LED drivers are AC/DC circuits including a bridge rectifier. However, it would be apparent to people skilled in the art that the bridge rectifier is not necessary and can be omitted. Besides this, the voltage regulator is also not limited to LDO and can be replaced with other suitable circuits or even omitted. Furthermore, the LED driver can be used to drive an individual LED or multiple LEDs. And besides Buck-boost circuit, the LED driver may be configured in other suitable topologies, such as shown in FIGS. 8 and 9.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. An LED driver, comprising:
    a switching converter configured to provide a driving current for an LED, wherein the switching converter has a main switch and a first winding coupled to the main switch, and wherein the first winding stores energy when the main switch is on and provides the energy to the LED when the main switch is off;
    a second winding magnetically coupled to the first winding, wherein the second winding has a first terminal configured to provide a power supply voltage and a second terminal;
    a first sensing resistor having a first terminal and a second terminal, wherein the first terminal is coupled to the main switch;
    a second sensing resistor having a first terminal and a second terminal, wherein the first terminal is coupled to the second terminal of the first sensing resistor and the second terminal of the second winding, the second terminal is coupled to a reference ground;
    an output current calculator coupled to the first terminal of the first sensing resistor, wherein based on the voltage at the first terminal of the first sensing resistor, the output current calculator calculates an equivalent value of the driving current and generates an equivalent current signal;
    an error amplifier coupled to the output current calculator and configured to generate a compensation signal based on the equivalent current signal and a reference voltage; and
    a control circuit coupled to the error amplifier, wherein based on the compensation signal, the control circuit generates a control signal to control the main switch.

2. The LED driver of claim 1, further comprising:
    a voltage regulator having a input terminal and an output terminal, wherein the input terminal is coupled to the first terminal of the second winding, and the output terminal is configured to provide the power supply voltage.

3. The LED driver of claim 2, wherein the voltage regulator is a low dropout linear regulator.

4. The LED driver of claim 1, wherein the power supply voltage is provided to a wireless module and a microcontroller unit, the wireless module receives a wireless signal, and wherein based on the wireless signal, the microcontroller unit generates a dimming signal to adjust the brightness of the LED.

5. The LED driver of claim 4, further comprising:
    a reference generator coupled to the microcontroller unit and configured to generate the reference voltage based on the dimming signal.

6. The LED driver of claim 1, wherein the switching converter comprises a Buck-Boost circuit or a Flyback circuit.

7. The LED driver of claim 1, wherein the first winding has a first terminal and a second terminal, the main switch has a first terminal coupled to the second terminal of the first winding, a second terminal coupled to the first terminal of the first sensing resistor, and a control terminal, and wherein the switching converter further comprises:
    a rectifier bridge having an input terminal and an output terminal, wherein the input terminal is configured to receive an AC input voltage, and the output terminal is configured to provide a DC voltage to the first terminal of the first winding and the cathode of the LED;

an input capacitor coupled between the output terminal of the rectifier bridge and the reference ground;

a freewheeling device coupled between the second terminal of the first winding and the anode of the LED; and an output capacitor coupled to the LED in parallel.

8. The LED driver of claim 7, wherein the control circuit comprises:

a multiplier having a first input terminal, a second input terminal and an output terminal, wherein the first input terminal is configured to receive an input sensing signal indicative of the DC voltage, the second input terminal is coupled to the error amplifier to receive the compensation signal, and wherein the multiplier multiplies the input sensing signal with the compensation signal and generates a product signal at the output terminal;

a comparator having a first input terminal, a second input terminal and an output terminal, wherein the first input terminal is coupled to the first terminal of the first sensing resistor, the second input terminal is coupled to the output terminal of the multiplier, and the output terminal is configured to provide a comparison signal;

a zero cross detector configured to detect whether the current flowing through the first winding crosses zero and generate a zero cross detection signal; and a logic circuit having a first input terminal, a second input terminal and an output terminal, wherein the first input terminal is coupled to the output terminal of the comparator, the second input terminal is coupled to the zero cross detector, and wherein based on the comparison signal and the zero cross detection signal, the logic circuit generates the control signal at the output terminal.

9. An LED driver, comprising:

a switching converter configured to provide a driving current for an LED, wherein the switching converter has a main switch and a first winding coupled to the main switch, and wherein the first winding stores energy when the main switch is on and provides the energy to the LED when the main switch is off;

a second winding magnetically coupled to the first winding and configured to provide a power supply voltage;

a signal processor configured to receive a first current sensing signal indicative of the current flowing through the main switch and a second current sensing signal indicative of the current flowing through the second winding, wherein based on the first and second current sensing signals, the signal processor generates a processing signal;

an output current calculator coupled to the signal processor, wherein based on the processing signal, the output current calculator calculates an equivalent value of the driving current and generates an equivalent current signal;

an error amplifier coupled to the output current calculator and configured to generate a compensation signal based on the equivalent current signal and a reference voltage; and a control circuit coupled to the error amplifier, wherein based on the compensation signal, the control circuit generates a control signal to control the main switch.

10. The LED driver of claim 9, further comprising:

a voltage regulator having a input terminal and an output terminal, wherein the input terminal is coupled to the second winding, and the output terminal is configured to provide the power supply voltage.

11. The LED driver of claim 9, wherein the power supply voltage is provided to a wireless module and a microcontroller unit, the wireless module receives a wireless signal, and wherein based on the wireless signal, the microcontroller unit generates a dimming signal to adjust the brightness of the LED.

12. The LED driver of claim 11, further comprising:

a reference generator coupled to the microcontroller unit and configured to generate the reference voltage based on the dimming signal.

13. The LED driver of claim 9, wherein the processing signal is equal to the difference between the first current sensing signal and the second current sensing signal.

14. A control method of an LED driver, wherein the LED driver configured to provide a driving current for an LED comprises a main switch, a first winding coupled to the main switch and a second winding magnetically coupled to the first winding, the first winding stores energy when the main switch is on and provides the energy to the LED when the main switch is off, the control method comprises:

sensing the current flowing through the main switch and generating a first current sensing signal;

sensing the current flowing through the second winding and generating a second current sensing signal;

generating a processing signal based on the first and second current sensing signals;

calculating an equivalent value of the driving current and generating an equivalent current signal based on the processing signal;

generating a compensation signal based on the equivalent current signal and a reference voltage; and generating a control signal based on the compensation signal to control the main switch.

15. The control method of claim 14, wherein the LED driver further comprises a voltage regulator coupled to the second winding and configured to provide the power supply voltage to a wireless module.

16. The control method of claim 15, further comprising:

receiving a wireless signal through the wireless module; and generating a dimming signal based on the wireless signal to adjust the brightness of the LED.

17. The control method of claim 14, wherein the processing signal is equal to the difference between the first current sensing signal and the second current sensing signal.

* * * * *